United States Patent [19]

James et al.

[11] 4,307,618
[45] Dec. 29, 1981

[54] FLUID FLOWMETER HAVING AN OPTICAL FIBER SENSING ELEMENT

[75] Inventors: Kenneth A. James, Corona Del Mar; William H. Quick, La Habra Heights; Virgil H. Strahan, Orange; Rudolf R. August, Laguna Beach, all of Calif.

[73] Assignee: Rockwell International Corporation, El Segundo, Calif.

[21] Appl. No.: 127,030

[22] Filed: Mar. 4, 1980

[51] Int. Cl.³ .......................... G01F 1/32; G01F 1/28
[52] U.S. Cl. ............................... 73/861.21; 73/861.74
[58] Field of Search ........... 73/861.21, 861.24, 861.22, 73/651, 653, 655, 861.74, 861.71; 250/227, 573

[56] References Cited

U.S. PATENT DOCUMENTS

| | | | |
|---|---|---|---|
| 1,215,135 | 2/1917 | Fischer | 73/861.24 |
| 1,935,445 | 11/1933 | Heinz | 73/861.24 |
| 3,213,197 | 10/1965 | Hawkins | 73/517 |
| 3,224,279 | 12/1965 | Galli et al. | 73/651 |
| 3,602,037 | 8/1971 | Neu | 73/651 |
| 4,171,643 | 10/1979 | Frick | 73/861.24 |
| 4,206,642 | 6/1980 | Bearcroft | 73/861.24 |

*Primary Examiner*—Herbert Goldstein
*Attorney, Agent, or Firm*—H. Fredrick Hamann; Richard A. Bachand

[57] ABSTRACT

An inexpensive, non-obtrusive optical flowmeter is disclosed comprising at least one flexible, light transmitting optical fiber rod having an enlarged (e.g. spherical) terminus formed at a fluid responsive end thereof. The flexible optical fiber is inserted into a fluid channel in such a manner that the enlarged terminus oscillates at a frequency that is a function of the rate of fluid flow. The intensity and frequency of an optical signal being transmitted via the optical fiber to an optical detector are related to the rate at which fluid flows through the channel. By detecting the intensity and frequency of the optical signal at different times for corresponding rates of fluid flow, an accurate (digital) representation of a particular rate of fluid flow can be obtained.

21 Claims, 4 Drawing Figures

FLUID FLOWMETER HAVING AN OPTICAL FIBER SENSING ELEMENT

BACKGROUND OF THE INVENTION

1. Field of the Invention

This invention relates to a rugged, low cost fluid flow meter having an optional fiber sensing element that is adapted to provide an accurate (digital) representation of the rate (e.g. velocity, volume, and mass) of fluid flow in a remote or inaccessible channel.

2. Prior Art

There presently exists the need to be able to accurately and non-electrically measure the rate of flow of a fluid in a channel, which channel may be remotely located from or inaccessible to a control or test station and which fluid may be characterized as volatile or hazardous, if exposed to a spark. By way of example, an accurate indication of certain physical parameters, such as, velocity, mass, and volume, of a fluid (e.g. liquid oxygen, hydrozene, or gasoline) flowing in a relatively narrow or remotely located channel is necessary in order to efficiently control the operation of certain fluid systems, such as a fuel management system, a chemical processing system, and the like.

However, conventional mechanical flow meters are typically either cumbersome in size and weight or relatively expensive to fabricate, so as to be unsuitable for measuring the rate of fluid flow in a remote or narrow channel. When optical techniques have been employed in the past to provide an indication of fluid flow, some of either couplers, analog-to-digital conversion apparatus, or optical-to-electric or electric-to-optical interfaces have been undesirably required, whereby the reliability, flexibility, and overall cost of the system may be adversely affected. Moreover, in the event that an accurate digital representation of the rate of fluid flow is desired, conventional flowmeters are not easily adapted to provide such a representation without the utilization of relatively complex circuitry.

Examples of conventional sensing apparatus which include optical techniques to provide an indication of a physical parameter of a fluid can be found in the following U.S. patents:

| U.S. Pat. No. | Issue Date |
| --- | --- |
| 2,892,378 | June 30, 1959 |
| 3,163,767 | December 29, 1964 |
| 3,273,447 | September 20, 1966 |
| 3,807,390 | April 30, 1974 |

SUMMARY OF THE INVENTION

Briefly, and in general terms, this invention relates to an optical flowmeter that, in one application, is suitable to provide an accurate (digital) indication of fluid flow rate through a narrow, remote, or inaccessible fluid channel. The flowmeter comprises a flexible, light conveying, transmitting optical fiber. One end of the transmitting optical fiber is suspended from a support structure (e.g. a fluid seal), and the second end thereof is positioned in the fluid stream and adapted to oscillate in response to the flow of fluid. A source of light supplies incident light signals to the suspended first end, and an optical detector is interfaced with the oscillating second end, so as to receive output light signals therefrom. The intensity and frequency of the output light signals are indicative of the rate of fluid flow through the fluid channel.

The optical detector comprises a light conveying, detecting optical fiber and a sensing device, such as, for example, a semiconductor diode. One end of the detecting optical fiber is suspended from the support structure and provides the output light signals to the sensor. The second end of the detecting fiber is positioned in close proximity to the second end of the transmitting optical fiber. In order to enhance optical coupling therebetween, and in one embodiment of the invention, the respective second ends of the transmitting and detecting optical fibers are each provided with enlarged portions. In a second embodiment, the respective second ends may be connected together at a common, enlarged portion.

DESCRIPTION OF THE PREFERRED EMBODIMENT

Figure 1:
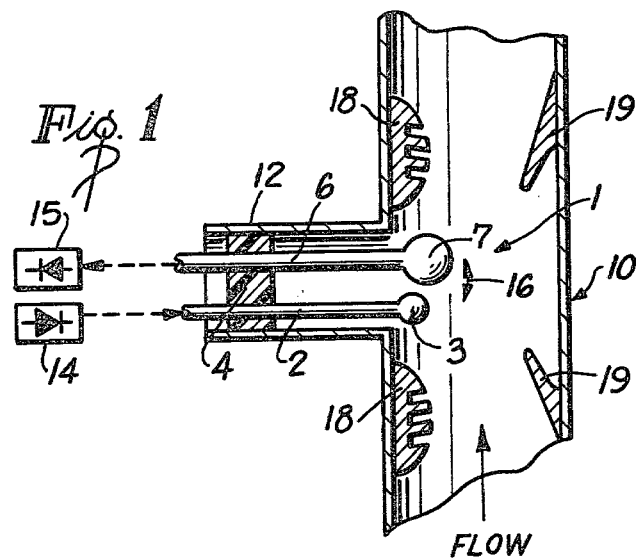
FIGS. 1-3 of the drawings show the compact, non-obtrusive optical flowmeters that form the present invention.

FIG. 1 of the drawings illustrates a rugged, lightweight, and inexpensive cantilever type optical flowmeter 1. The flowmeter 1 comprises an elongated transmitting optical fiber rod 2 that is fabricated from a well known clad, light conducting material, such as, for example, optical glass or plastic. The transmitting optical fiber 2 may be of either a single mode or multimode type. One end of optical fiber 2 is suspended from a supporting structure 4 which, as will shortly be explained, may be a suitable fluid seal. The free end 3 of optical fiber 2 is preferably enlarged, in the shape of a sphere, so as to provide broad, but efficient, light coupling with an associated optical detector. However, it is to be understood that the free end 3 of transmitting optical fiber 2 may consist of any convenient geometrical shape, such as, for example, a cleavage plane, a tapered section, or the like, such that the shape selected will characteristically increase optical coupling with said associated detector.

In a preferred embodiment of the invention, the optical detector comprises an elongated receiving optical fiber rod 6 which is fabricated from the same clad, light fiber conducting material as transmitting fiber 2. One end of receiving optical fiber 6 is suspended from the aforementioned supporting structure or seal 4. The free end 7 of fiber 6 is also preferably enlarged to form a suitable shape (such as a sphere) that is adapted to maximize optical coupling with the free end 3 of fiber 2. The enlarged free ends 3 and 7 of transmitting and receiving optical fibers 2 and 6, respectively, may be formed by removing the cladding and heating those ends until a fused spherical, or the like, configuration is obtained. The transmitting and receiving optical fibers 2 and 6 are arranged in supporting structure 4, so that the spherical ends 3 and 7 thereof are positioned in relatively close proximity to one another, whereby fibers 2 and 6 will be compatible as component members of a transmitter-detector pair. The diameter of the transmitting optical fiber 2 may be made narrower than that of the receiving optical fiber 6, so that transmitting fiber 2 is relatively flexible, while receiving fiber 6 is substantially rigid.

The presently disclosed flowmeter 1 has particular application as a compact and non-obtrusive device for accurately monitoring the rate of flow of a fluid through a pipe or tubing 10. The pipe 10 may be one that is inaccessible or remotely located from a command or test station. The fluid seal 4, from which seal one end of each of transmitting and receiving optical fibers 2 and 6 is suspended, is inserted into a fluid channel 12, so as to block the flow of fluid therepast. Fluid channel 12 merges with a section of the pipe 10 through which the fluid to be monitored flows in a direction represented by the arrow. The seal 4 is inserted into channel 12, such that each of the enlarged, free ends 3 and 7 of optical fibers 2 and 6 extends into the interior of pipe 10 as cantilevers. In the embodiment shown in FIG. 1, the enlarged, spherical ends 3 and 7 are located in pipe 10, so as to be positioned in substantially perpendicular alignment with the direction of fluid flow. However, this particular alignment is not to be considered a limitation of the present invention, and alternative alignments will subsequently be described.

A suitable source of either coherent or incoherent light, such as, for example, an incoherent light emitting diode source 14 is positioned adjacent the suspended end of transmitting optical fiber 2. Incident light signals are conducted from the source 14 thereof, through fiber 2, to the spherical end 3. The optical detector may comprise a suitable sensing device 15 that is positioned adjacent the suspended end of receiving fiber 6, so as to be responsive to output light signals that are conducted to device 15 via spherical end 7 and transmitting optical fiber 6. By way of example, sensing device 15 may include a semiconductor diode, such as a PIN photodiode, or the like.

Figure 4:
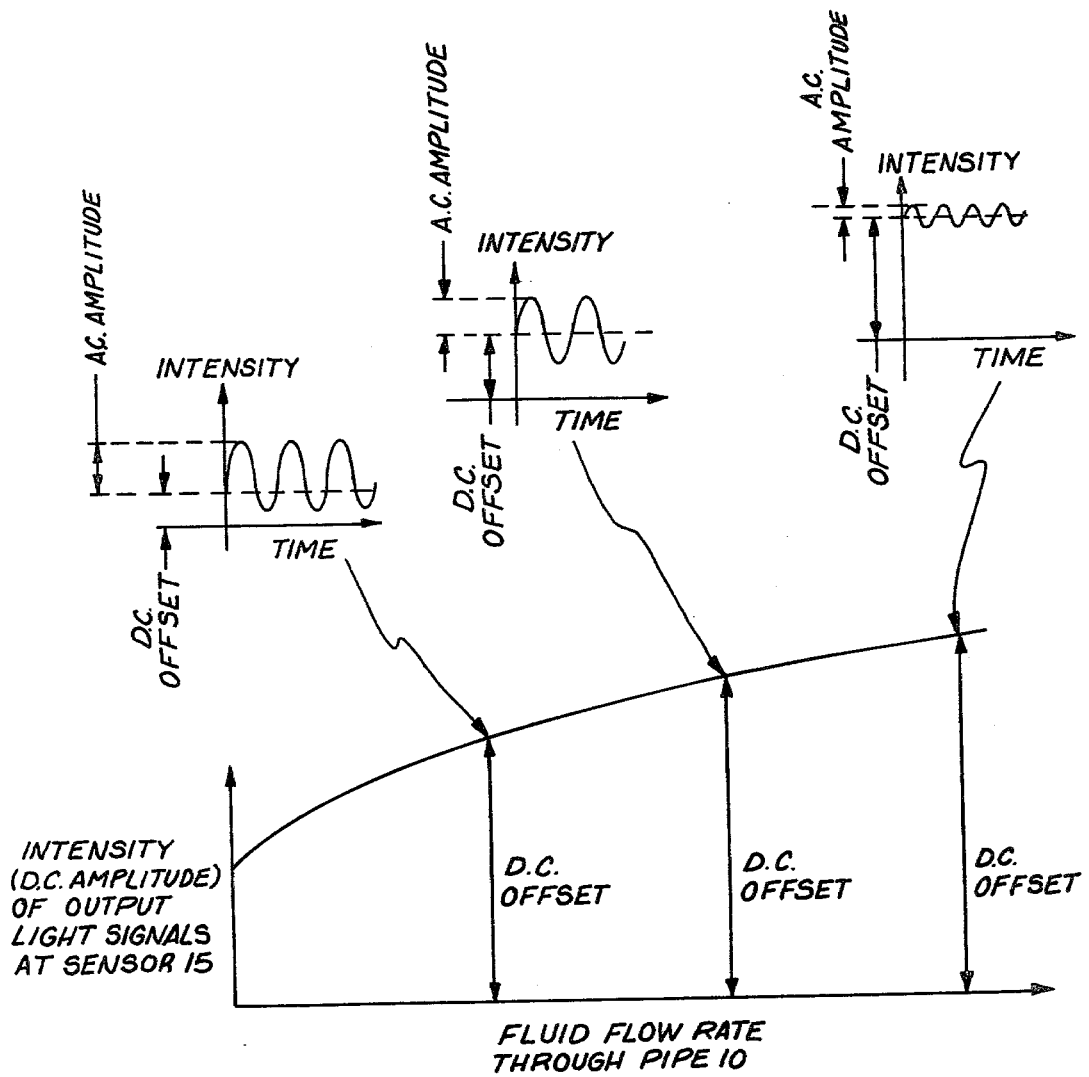
FIG. 4 of the drawings illustrates the relationship between the intensity and frequency of the detected output light signals at different times with corresponding rates of fluid flow.

In operation, and referring concurrently to FIGS. 1 and 4 of the drawings, over a first range of fluid velocities, the spherical free end 3 of flexible, transmitting optical fiber 2 is caused to oscillate (in a direction generally indicated by the arrows designated 16) at a particular frequency that is a function of the velocity of the fluid flow through pipe 10, the diameter of pipe 10, and the presence of anomolous particles within the flow. As will be known to those skilled in the art, such oscillation is typically caused, in part, by vortex shedding relative to the spherical end 3 of optical fiber 2. Eventually, and over a second range of (increased) fluid velocities, the spherical end 3 of fiber 2 will cease to oscillate, but will become continuously deflected (in the general direction of the fluid flow).

It will be recognized by those skilled in the art and as illustrated in FIG. 4, after suitable initialization of the flowmeter 1, both the intensity of the output light signals that are reflected to the spherical end 7 of receiving optical fiber 6 and the frequency of oscillation of the spherical end 3 of transmitting optical fiber 2 are related to the rate of fluid flow through pipe 10. Moreover, the intensity of the output light signals will vary at the same rate as the frequency of spherical end 3. The peak (or peak-to-peak) amplitude of the output light signal detected by sensor 15 at a particular time may be referred to as the a.c. component of the output optical signal. The average of the amplitudes of the output light signals detected by sensor 15 at different times, which amplitudes corresponding to respective rates of fluid flow, may be referred to as the d.c. component (or d.c. offset) of the output optical signal. Accordingly, as the rate of fluid flow through pipe 10 increases, both the d.c. component of the output optical signal and the frequency at which the spherical end 3 of optical fiber 2 oscillates increase, while the a.c. component of the output optical signal decreases. Ultimately, and at increasingly higher rates of fluid flow through pipe 10, (i.e. where the spherical end 3 of fiber 2 starts to continuously deflect, such that the oscillation thereof eventually ceases), the a.c. component of the output optical signal is substantially eliminated, and the level of the output optical signal approaches the d.c. offset thereof. However, after the elimination of the a.c. component of the output optical signal, the d.c. offset thereof may continue to increase in response to increasingly higher fluid velocities.

To provide a control or test station with a suitable indication of fluid flow, the output signals from the sensor 15 may be supplied, for storage or additional processing, to conventional signal processing apparatus (not shown) that is responsive to both the frequency and amplitude of the output optical signal conveyed to sensor 15 via receiving fiber 6. It may be noted that the frequency of the output optical signal detected by sensor 15 is in a format that can be easily converted into a digital representation of fluid flow through pipe 10 over a particular range of fluid flow. Should it be desirable to extend the range of fluid flow to which the flowmeter 1 is responsive, a suitable baffling arrangement 18 and 19 may be inserted within the interior of pipe 10, whereby to extend the frequency range over which transmitting fiber 2 can oscillate before the continuous deflection thereof occurs.

Figure 2:
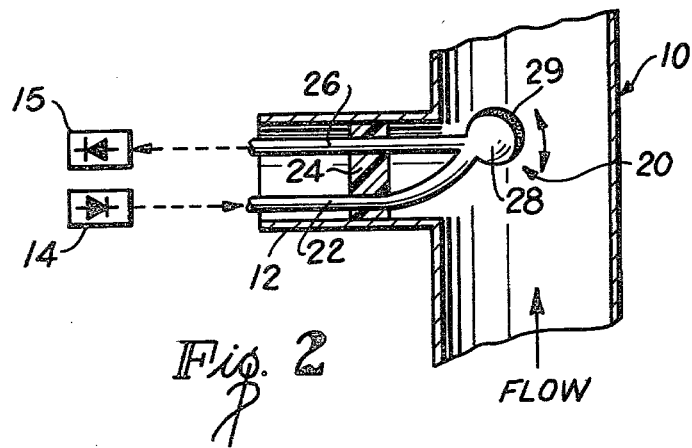

FIG. 2 of the drawings illustrates another cantilever type optical flowmeter 20 of the present invention. The flowmeter 20 comprises an elongated, clad transmitting optical fiber rod 22 and an elongated, clad receiving optical fiber rod 26. One end of each of transmitting and receiving optical fibers 22 and 26 is suspended from a suitable supporting structure 24, which may be a fluid seal. The free ends of optical fibers 22 and 26 are joined together at a common, unclad end, which end is preferably fused into the shape of an enlarged sphere 28, or the like, whereby fibers 22 and 26 form an integrated transmitter-detector pair. The common spherical end 28 of optical fibers 22 and 26 enhances optical coupling between said fibers and provides sufficient mass for resistance and responsiveness to fluid flow at varying fluid velocites. To maximize the optical coupling between transmitting and receiving fibers 22 and 26, the spherical end 28 may be covered with a suitable reflecting material 29 such a silver, aluminum, or the like. A desired amount of flexibility in the transmitting and receiving optical fibers 22 and 26 can be achieved by drawing out the fibers to any desired diameter.

The presently disclosed flow meter 20 has particular application as a compact and non-obtrusive device for accurately monitoring the rate of flow of a fluid through a pipe or tubing 10 that may be remote or inaccessible to a control or test station. Therefore, the fluid seal 24 can be inserted into a fluid channel 12, such that the spherical common end 28 of optical fibers 22 and 26 extends into the interior of pipe 10 as a cantilever. Similar to the alignment of the flowmeter shown in FIG. 1, the spherical end 28 is located in pipe 10, so as to be positioned in substantially perpendicular alignment with the direction of fluid flow. A suitable source 14 of incident light is positioned adjacent the suspended end of transmitting optical fiber 22. Incident light signals are conducted from the source 14 thereof, through fiber 22, to the common spherical ends 28. A suitable optical sensing device 15 is positioned adjacent the suspended end of receiving optical fiber 26, so as to be responsive to output light signals that are reflected from spherical end 28 and supplied thereto via optical fiber 26.

The operation of the flowmeter 20 of FIG. 2 is similar to that of the flowmeter 1 of FIG. 1, as previously disclosed when referring concurrently to FIGS. 1 and 4 of the drawings. Therefore, the details of the operation of flowmeter 20 will not be repeated hereat.

Figure 3:
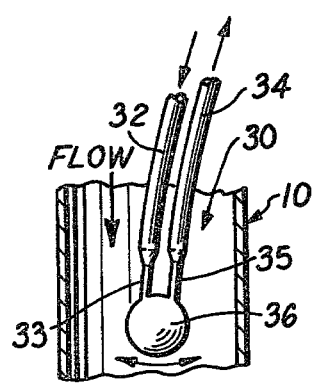

FIG. 3 of the drawings illustrates another flowmeter 30 of the present invention. The flowmeter 30 comprises an elongated, clad transmitting optical fiber rod 32 and an elongated, clad receiving optical fiber rod 34. One end of each of optical fibers 32 and 34 is joined together at a common, unclad end, which end is preferably fused into the shape of an enlarged sphere 36, or the like. Hence, optical fibers 32 and 34 form an integrated transmitter-detector pair. The common spherical end 36 of optical fibers 32 and 34 enhances optical coupling between said fibers. The flowmeter 30 is located in pipe 10, so as to be positioned in a generally parallel alignment with the direction of the fluid flow. A desired amount of flexibility in the transmitting and receiving otical fibers 32 and 34 can be achieved by drawing out the fibers to any desired diameter, so that the common spherical end 36 will be responsive to fluid flowing through a pipe or tubing 10, but will not contact the interior walls of pipe 10. As a modification, portions 33 and 35 of transmitting and receiving fibers 32 and 34 that are closest to spherical end 36 may be tapered or narrowed. Accordingly, the range of frequencies at which end 36 oscillates can be selectively controlled.

A suitable source (not shown) of incident light is positioned adjacent the other end of transmitting optical fiber 32. Incident light signals are conducted from the source thereof, through fiber 32, to the common spherical end 36. A suitable optical sensing device (also not shown) is positioned adjacent the other end of receiving optical fiber 34, so as to be responsive to output light signals that are reflected from spherical end 36 and supplied thereto via optical fiber 34.

The operation of the flowmeter 30 of FIG. 3 is similar to that previously disclosed when referring concurrently to FIGS. 1 and 4 of the drawings. Therefore, the details of the operation of flowmeter 30 will not be repeated hereat.

It will be apparent that while a preferred embodiment of the invention has been shown and described, various modifications and changes may be made without departing from the true spirit and scope of the invention. For example, the respective receiving optical fiber and sensor 15 utilized in each of the flowmeter embodiments of FIGS. 1-3 may be replaced by any other suitable optical detector. Moreover, incident light signals may be introduced and output light signals detected from the suspended ends of either one of the transmitting or receiving optical fibers. What is more, both the incident and reflected light signals may be conveyed and detected by means of a single optical fiber rod.

Having thus set forth a preferred embodiment of the present invention, what we claim is:

1. A fluid flowmeter comprising:
    at least one first optical fiber,
    light source means to supply incident light signals to a first end of said optical fiber,
    the second end of said optical fiber being positioned within a fluid and adapted to oscillate in response to the flow of the fluid, said second end having a relatively enlarged portion formed thereat, and p1 optical detector means to receive output light signals from the second end of said optical fiber, the enlarged portion of which providing a particular flow resistance and enhancing the optical coupling of the output light signals to said detector means, the intensity and frequency of the output light signals being indicative of the rate of fluid flow.

2. The fluid flowmeter recited in claim 1, further comprising a reflective material applied to at least some of said enlarged portion, whereby to increase optical coupling of the output light signals to said optical detector means.

3. The fluid flowmeter recited in claim 1, wherein the first end of said optical fiber is suspended from a support means.

4. The fluid flowmeter recited in claim 1 wherein said optical fiber includes a relatively narrow portion located between said first end and said enlarged portion at the second end thereof, said narrowed portion controlling the frequency at which said second end oscillates in response to the fluid flow.

5. The fluid flowmeter recited in claim 1, wherein said optical detector means includes a second optical fiber and a sensor,
    said second optical fiber positioned between the second end of said first optical fiber and said sensor, whereby to convey the output light signals to said sensor.

6. The fluid flowmeter recited in claim 5, wherein said sensor includes a semiconductor diode.

7. The fluid flowmeter recited in claim 5, wherein the thickness of said second optical fiber is greater than that of said first optical fiber, whereby said second optical fiber is substantially non-oscillatory in response to the fluid flow.

8. The fluid flowmeter recited in claim 5, wherein a first end of said second optical fiber includes an enlarged portion formed thereat, the respective enlarged portions of said first and second optical fibers being positioned in proximity to one another for enhancing optical coupling therebetween.

9. The fluid flowmeter recited in claim 5, wherein one end of said second optical fiber is suspended from a support means.

10. The fluid flowmeter recited in claim 5, wherein the enlarged portion formed at the second end of said fiber optical fiber and one end of said second optical fiber are interconnected with one another to form a common end therefor.

11. The fluid flowmeter recited in claim 10, wherein said enlarged common end has a greater thickness than the thickness of either of said first or second optical fibers.

12. The fluid flowmeter recited in claim 11, wherein some of said enlarged end is covered with a reflective material, whereby to improve optical coupling between said first and second optical fibers.

13. An optical flowmeter for monitoring the rate of fluid flow in a channel, said flowmeter comprising:
    first flexible light transmitting means, a first end of said first light transmitting means suspended from support means, and the seconc end of said first light transmitting means positioned in said channel and adapted to oscillate in response to the fluid flow, light source means positioned to supply incident light signals to the suspended first end of said first light transmitting means, second light transmitting means, a first end of said second light transmitting means suspended from said support means, and the second end of said second light transmitting means positioned in said channel and in proximity to the second end of said first light transmitting means in order to permit optical coupling therebetween, and optical detector means positioned to receive output light signals from the suspended first end of said second light transmitting means, the output light signals being supplied to said suspended first end from the oscillatory second end of said first light transmitting means and the second end of said second light transmitting means, the frequency of oscillation of the second end of said first light transmitting means and the optical characteristics of the corresponding output light signals supplied therefrom providing an indication of the rate of fluid flow in the channel.

14. The optical flowmeter recited in claim 13, wherein said first light transmitting means includes at least one optical fiber.

15. The optical flowmeter recited in claim 13, including baffling means positioned in said fluid channel, whereby to minimize the turbulence of the fluid which flows through said channel and causes the second end of said first light transmitting means to oscillate.

16. The optical flowmeter recited in claim 13, wherein the second end of said first light transmitting means includes an enlarged portion, whereby to enhance optical coupling of the output light signals from said enlarged portion to the second end of said second light transmitting means.

17. The optical flowmeter recited in claim 13, wherein said second light transmitting means includes at least one optical fiber, the second end of said optical fiber having an enlarged portion formed thereat and positioned in proximity to the second end of said first light transmitting means so as to improve optical coupling therebetween.

18. An optical flowmeter for measuring the rate of fluid flow through a channel, said flowmeter comprising:

a first light transmitting optical fiber, a first end of said optical fiber being positioned in said channel, so as to be caused to oscillate in response to fluid flowing therepast, light source means for supplying incident light signals to the oscillating first end of said optical fiber, and optical detector means to receive output light signals that are supplied thereto from the first end of said optical fiber, said optical detector means including first means by which to measure the frequency of the output light signals and second means by which to measure the intensity of the output light signals, the frequency and intensity of the output light signals being indicative of the rate of fluid flow through said channel.

19. The optical flowmeter recited in claim 18, wherein the first end of said optical fiber has an enlarged portion formed thereat for providing a particular flow resistance and for enhancing optical coupling of the output light signals from said first end to said optical detector means.

20. The optical flowmeter recited in claim 18, including a second light transmitting optical fiber extending into said channel and positioned between the first end of said first optical fiber and said optical detector means for transmitting the output light signals from said first end to said detector means.

21. The optical flowmeter recited in claim 20, wherein said second optical fiber has a thickness which is greater than that of said first optical fiber, so that said second optical fiber is substantially non-oscillatory in response to fluid flowing therepast.

* * * * *

UNITED STATES PATENT AND TRADEMARK OFFICE
CERTIFICATE OF CORRECTION

PATENT NO. : 4,307,618

DATED : December 29, 1981

INVENTOR(S) : Kenneth A. James et al.

It is certified that error appears in the above-identified patent and that said Letters Patent are hereby corrected as shown below:

Column 6, line 4, delete [p1] and line 51, change first occurrence of
[fiber] to read -- first --.

Signed and Sealed this

Sixteenth Day of March 1982

[SEAL]

Attest:

Attesting Officer

GERALD J. MOSSINGHOFF

Commissioner of Patents and Trademarks